United States Patent
Lin et al.

(10) Patent No.: US 9,182,645 B2
(45) Date of Patent: Nov. 10, 2015

(54) PORTABLE ELECTRONIC DEVICE

(71) Applicant: HTC CORPORATION, Taoyuan, Taoyuan County (TW)

(72) Inventors: Ming-Tien Lin, Taoyuan (TW); Chun-Ta Lin, Taoyuan (TW); Chih-Jen Hu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 135 days.

(21) Appl. No.: 14/030,630

(22) Filed: Sep. 18, 2013

(65) Prior Publication Data

US 2015/0077830 A1   Mar. 19, 2015

(51) Int. Cl.
| | |
|---|---|
| *G02B 13/16* | (2006.01) |
| *H04N 5/225* | (2006.01) |
| *G09G 3/19* | (2006.01) |
| *G09G 5/10* | (2006.01) |
| *G02F 1/15* | (2006.01) |
| *G02F 1/163* | (2006.01) |
| *G02F 1/157* | (2006.01) |
| *G09G 3/34* | (2006.01) |
| *G02F 1/1343* | (2006.01) |
| *G02F 1/1335* | (2006.01) |
| *G02F 1/153* | (2006.01) |
| *G02F 1/19* | (2006.01) |

(52) U.S. Cl.
CPC ............ *G02F 1/163* (2013.01); *G02F 1/157* (2013.01); *G02F 1/133602* (2013.01); *G02F 1/15* (2013.01); *G02F 1/153* (2013.01); *G02F 1/19* (2013.01); *G02F 2001/134345* (2013.01); *G09G 3/3406* (2013.01); *G09G 2300/08* (2013.01); *G09G 2310/027* (2013.01); *G09G 2310/0256* (2013.01); *G09G 2310/0262* (2013.01); *G09G 2320/0233* (2013.01); *G09G 2320/0238* (2013.01); *G09G 2320/0626* (2013.01)

(58) Field of Classification Search
CPC .................. G09G 3/3406; G09G 2320/0233; G09G 2320/0626; G09G 2310/027; G09G 2320/0238; G09G 2300/08; G09G 2310/0256; G09G 2310/0262; G02F 1/19; G02F 2001/134345; G02F 1/15; G02F 1/53; G02F 1/157; G02F 1/133602; G02B 21/361
USPC ............. 348/335, 363, 376; 455/566; 345/49, 345/214, 690, 697; 250/229, 227.2, 216, 250/239; 359/265–275
See application file for complete search history.

(56) References Cited

U.S. PATENT DOCUMENTS

| | | | |
|---|---|---|---|
| 7,944,618 B2 * | 5/2011 | Ohishi et al. | ............ 359/665 |
| 2014/0192257 A1 * | 7/2014 | Gleason et al. | ............ 348/363 |

FOREIGN PATENT DOCUMENTS

| | | |
|---|---|---|
| CN | 1996202 A | 7/2007 |
| CN | 101046554 A | 10/2007 |
| CN | 101836158 A | 9/2010 |

*Primary Examiner* — Evelyn A Lester
(74) *Attorney, Agent, or Firm* — Birch, Stewart, Kolasch & Birch, LLP (57) ABSTRACT

A portable electronic device is provided, including a housing, a display module, an optical element and a switchable layer. The housing has a first surface and an opaque layer disposed under the first surface, the opaque layer having a first aperture and a second aperture. The display module is disposed under the first surface and overlapped with the first aperture. The optical element is disposed under the opaque layer. The switchable layer is disposed between the optical element and the second aperture and overlapping the second aperture, wherein the switchable layer is capable of being switched between a substantially opaque state and a substantially transparent state. The substantially opaque state prevents viewing of the optical element through the switchable layer and the substantially transparent state allows viewing of the optical element through the switchable layer.

20 Claims, 10 Drawing Sheets

PORTABLE ELECTRONIC DEVICE

CROSS REFERENCE TO RELATED APPLICATIONS

1. Field of the Invention

The present invention relates to a portable electronic device, and in particular, relates to a portable electronic device with an optical element such as image sensor or flashlight.

2. Description of the Related Art

Figure 1:
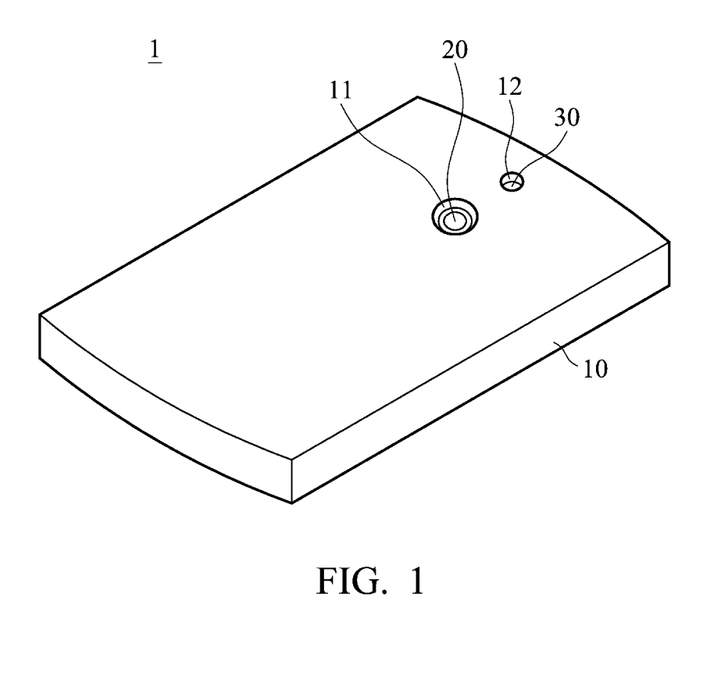
FIG. 1 shows a conventional portable electronic device.

FIG. 1 shows a conventional portable electronic device (smart phone) 1, which comprises a housing 10, a camera 20 and a flashlight 30. Conventionally, a camera opening 11 and a flashlight opening 12 are formed on the housing 10. Therefore, the camera 20 can capture images through the camera opening 11, and the light provided by the flashlight 30 is emitted through the flashlight opening 12.

However, the camera opening 11 and the flashlight opening 12 may not be aesthetically pleasing when applied to the conventional portable electronic device 1, and thus, decreases the attraction of the portable electronic device 1 to consumers.

BRIEF SUMMARY OF THE INVENTION

In one embodiment of the invention, a portable electronic device is provided. The portable electronic device includes a housing, a display module, an optical element and a switchable layer. The housing has a first surface and an opaque layer disposed under the first surface, the opaque layer having a first aperture and a second aperture. The display module is disposed under the first surface and overlapped with the first aperture. The optical element is disposed under the opaque layer. The switchable layer is disposed between the optical element and the second aperture and overlapping the second aperture, wherein the switchable layer is capable of being switched between a substantially opaque state and a substantially transparent state. The substantially opaque state prevents viewing of the optical element through the switchable layer and the substantially transparent state allows viewing of the optical element through the switchable layer.

Utilizing the portable electronic device of the embodiment of the invention, the optical unit (image sensor or light emitter) is disposed behind the front panel. Additionally, in the substantially opaque state, the optical unit is hidden and invisible. Therefore, the aesthetic appearance of the portable electronic device is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
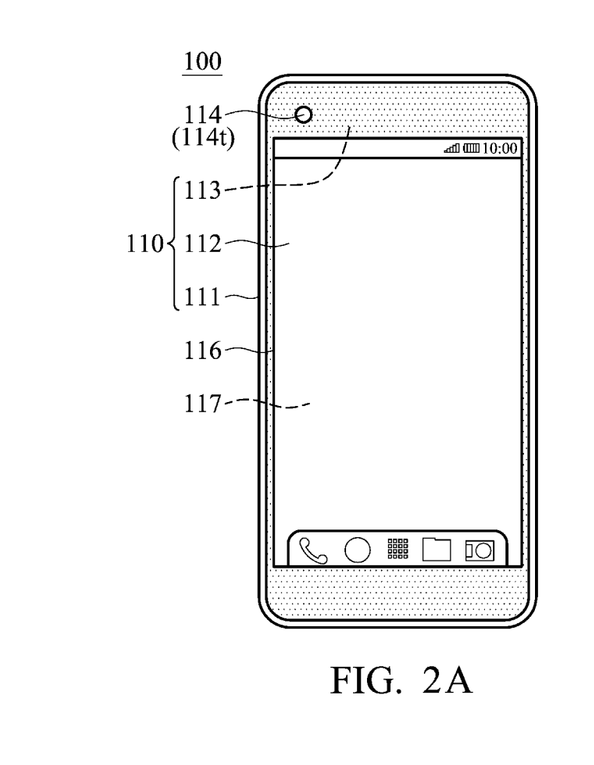
FIG. 2A shows a portable electronic device of the first embodiment of the invention, wherein the switchable layer is in the substantially transparent state.
Figure 2B:
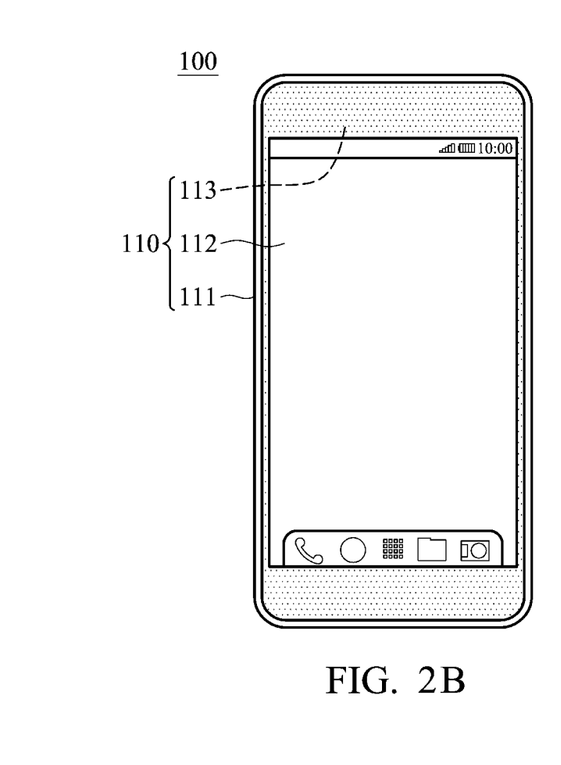
FIG. 2B shows a portable electronic device of the first embodiment of the invention, wherein the switchable layer is in the substantially opaque state.

FIGS. 2A and 2B show a portable electronic device 100 of a first embodiment of the invention, which comprises a housing 110, an optical element 120 (Refer to FIGS. 3A and 3B), a switchable layer 130 (Refer to FIGS. 3A and 3B) and a display module 117. The housing 110 comprises a body 111, a front panel 112 and an opaque layer 113, wherein the front panel 112 is connected to the body 111, and the opaque layer 113 is printed on an inner side of the front panel 112. The housing 110 has a first surface, which is on the first panel 112. The front panel 112 is transparent, comprising of glass or plastic. A first aperture 116 and a second aperture 114 are formed on the opaque layer 113. The second aperture 114 is defined as a transparent portion 114*t*. The display module 117 is disposed under the first surface and overlapped with the first aperture 116.

Figure 3A:
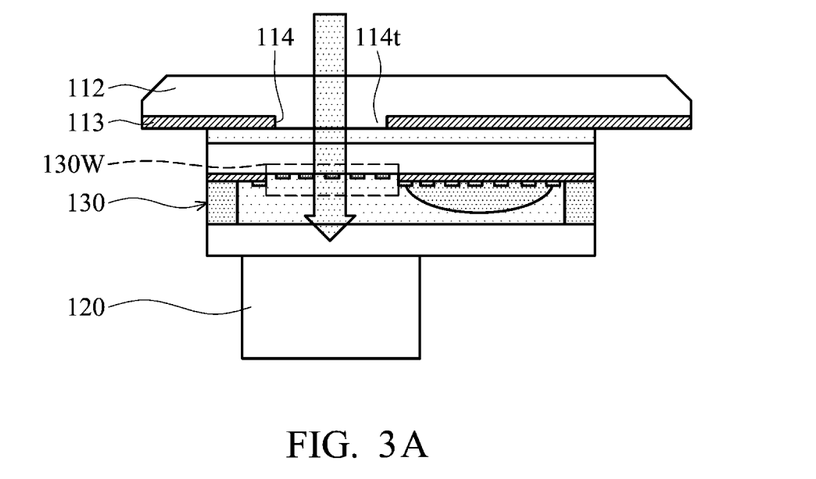
FIG. 3A shows a detailed structure of the optical element and the switchable layer of the embodiments of the invention, wherein the switchable layer is in the substantially transparent state.
Figure 3B:
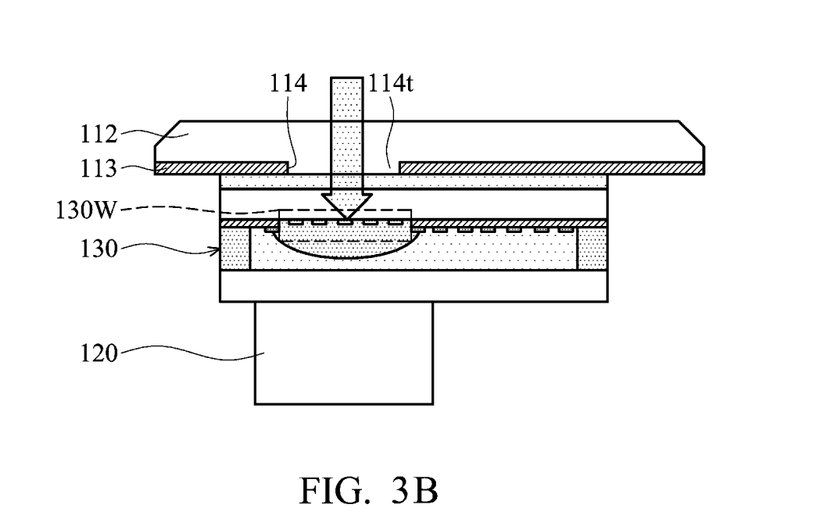
FIG. 3B shows a detailed structure of the optical element and the switchable layer of the embodiments of the invention, wherein the switchable layer is in the substantially opaque state.

Refer to FIGS. 3A and 3B, which are detailed structures of the optical element 120 and the switchable layer 130. The optical element 120 corresponds to the transparent portion 114*t*, which can be an image sensor or a flashlight. When the optical element 120 is an image sensor, the optical element 120 is capable to capture image through the transparent portion 114*t*. When the optical element 120 is a flashlight, the optical element 120 is capable to emitting light through the transparent portion 114*t*. In this embodiment, the optical element 120 is an image sensor. In one embodiment, the optical element 120 comprises a transflective sheet. In one embodiment, the optical element 120 comprises a printed logo, emblem, mark, shape, or alphanumeric characters.

Refer to FIGS. 3A and 3B, the switchable layer 130 is disposed between the optical unit 120 and the transparent portion 114*t*, wherein the switchable layer 130 comprises a window 130W corresponding to the transparent portion 114*t*.

When the switchable layer 130 is in a substantially opaque state (FIGS. 2B and 3B), the window 130W is colored to visually shelter the optical element 120 (Refer to FIG. 2B, the optical element 120 is sheltered and invisible). When the portable electronic device 100 is switched to an image capturing mode, the switchable layer 130 is switched from the substantially opaque state to a substantially transparent state (FIGS. 2A and 3A) allowing a light to pass through the window 130w (Refer to FIG. 2A, the optical element 120 can be seen). The substantially opaque state prevents viewing of the optical element 120 through the switchable layer and the substantially transparent state allows viewing of the optical element 120 through the switchable layer.

Utilizing the portable electronic device of the embodiment of the invention, the optical unit (image sensor or light emitter) is disposed behind the front panel. Additionally, in the substantially opaque state, the optical unit is hidden and invisible. Therefore, the aesthetic appearance of the portable electronic device is improved.

Figure 4A:
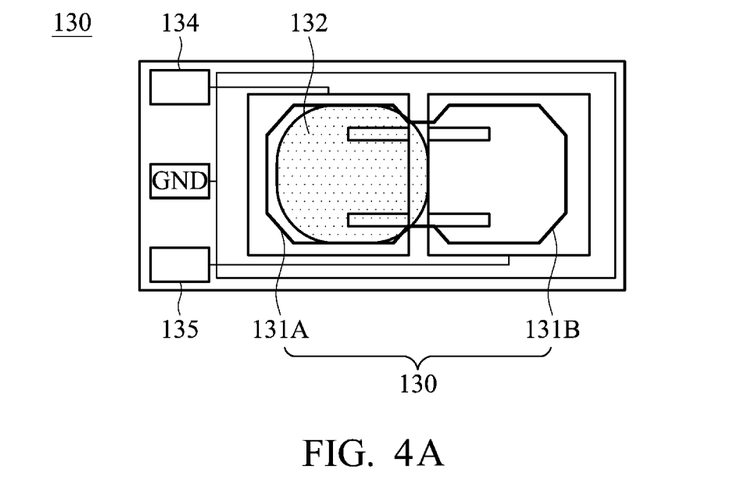
FIG. 4A is a top view of the switchable layer of the embodiments of the invention, wherein the switchable layer is in the substantially opaque state.
Figure 4B:
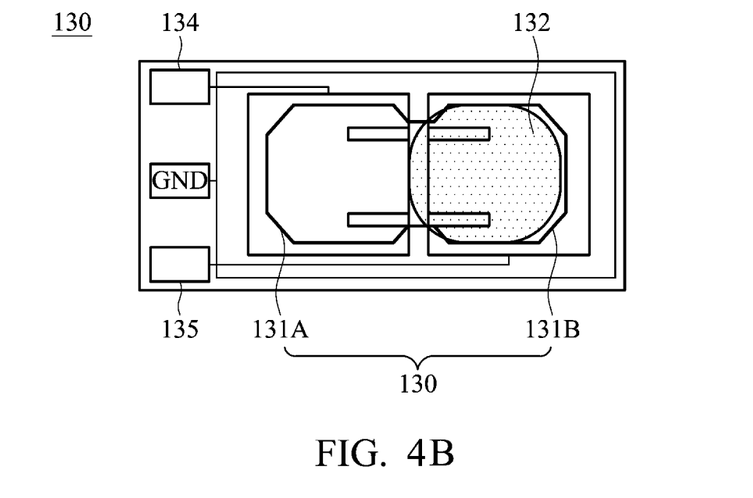
FIG. 4B is a top view of the switchable layer of the embodiments of the invention, wherein the switchable layer is in the substantially transparent state.
Figure 4C:
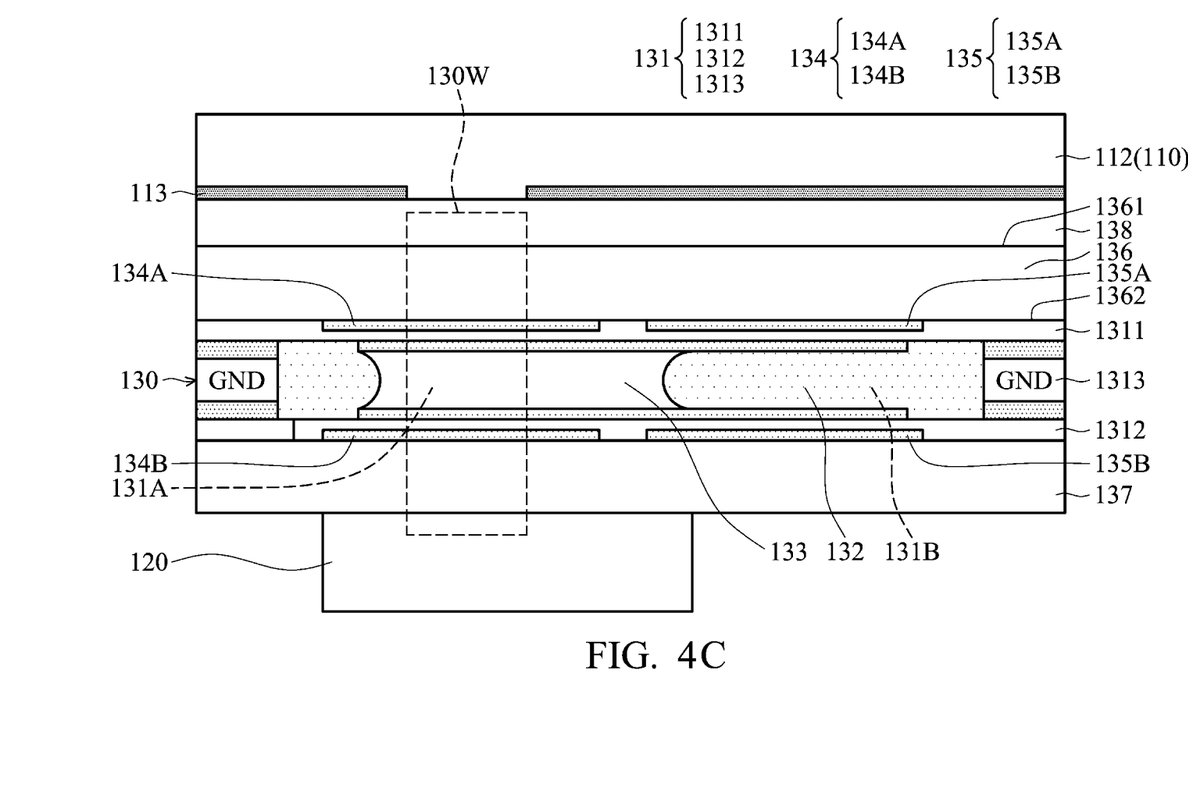
FIG. 4C shows a detailed structure of the switchable layer of the embodiments of the invention.

Refer to FIGS. 4A, 4B and 4C, in one embodiment, the switchable layer 130 comprises a chamber 131, an opaque liquid 132, a second liquid 133, a first electrode assembly 134 and a second electrode assembly 135. The chamber 131 comprises a first area 131A and a second area 131B (FIGS. 4A and 4B), wherein the window 130W is located in the first area 131A. The opaque liquid 132 is within the chamber 131, wherein the opaque liquid 132 is colored. The second liquid 133 is within the chamber 131 and does not mix with the opaque liquid 132, wherein the second liquid 133 is transparent. The first electrode assembly 134 corresponds to the first area 131A. The second electrode assembly 135 corresponds to the second area 131B. When the switchable layer 130 is in the substantially opaque state, the opaque liquid 132 is in the first area 131A (FIG. 4A). When the switchable layer 130 is switched from the substantially opaque state to the substantially transparent state, a voltage is applied to the second electrode assembly 135 to move the opaque liquid 132 from the first area 131A to the second area 131B (FIG. 4B).

In the embodiment of FIG. 4C, the opaque liquid 132 is water and the second liquid 133 is oil. The color of the opaque liquid 132 can be the same as the opaque layer 113. The chamber 131 comprises a first hydrophobic layer 1311, a second hydrophobic layer 1312 and a side wall 1313, wherein the side wall 1313 is sandwiched between the first hydrophobic layer 1311 and the second hydrophobic layer 1312, and the first hydrophobic layer 1311, the second hydrophobic layer 1312 and the side wall 1313 compose the chamber 131. The side wall 1313 is grounded. The first electrode assembly 134 comprises a first electrode 134B and a third electrode 134A. The first electrode 134B is disposed on the second substrate 137 and overlapped with the second aperture 114. The third electrode 134A is disposed on the first substrate 136 and overlapped with the second aperture 114. In one embodiment, the first electrode 134B is transparent.

The first electrode 134B and the third electrode 134A are respectively formed on the first hydrophobic layer 1311 and the second hydrophobic layer 1312. The second electrode assembly 135 comprises a second electrode 135B and a forth electrode 135A, which are respectively formed on the first hydrophobic layer 1311 and the second hydrophobic layer 1312. The second electrode 135B is disposed on the second substrate 137 and under the opaque layer 113. The forth electrode 135A is disposed on the first substrate 136 and under the opaque layer 113.

The switchable layer 130 is switched to the substantially transparent state by applying electrical potential on the first electrode 134B so that the opaque liquid configured to move to the second electrode 135B and the switchable layer is switched to the substantially opaque state by applying electrical potential on the second electrode 135B so that the opaque liquid is configured to move to the first electrode 134B.

In one embodiment, when the optical element 120 configured to generate light, the switchable layer 130 is switched to the substantially transparent state so that the light is transmitted through the switchable layer 130 and the second aperture and when the optical element 120 configured to not generate light, the switchable layer 130 is switched to the substantially opaque state In one embodiment, when optical element 120 configured to receive light via the second aperture, the switchable layer 130 is switched to the substantially transparent state so that the light is transmitted through the switchable layer 130 and when the optical element 120 configured to not receive the light, the switchable layer 130 is switched to the substantially opaque state.

In the embodiment of FIG. 4C, the switchable layer 130 further comprises a first substrate 136 and the second substrate 137, and the chamber 131, the first electrode assembly 134 and the second electrode assembly 135 are sandwiched between the first substrate 136 and the second substrate 137. The first substrate 136 is located between the chamber 131 and the front panel 112 (housing 110), and the second substrate 137 is located between the optical unit 120 and the chamber 131. The first substrate 136 is attached to an inner surface of the front panel 112 (housing 110) by an adhesive film 138. The first substrate 136 comprises a surface 1361 and a surface 1362, and the surface 1361 and the surface 1362 are coated with anti-reflection layer. With the anti-reflection layer, the light reflection due to optical interfaces is reduced, thereby sheltering effect of the switchable layer 130 is further improved.

Figure 5A:
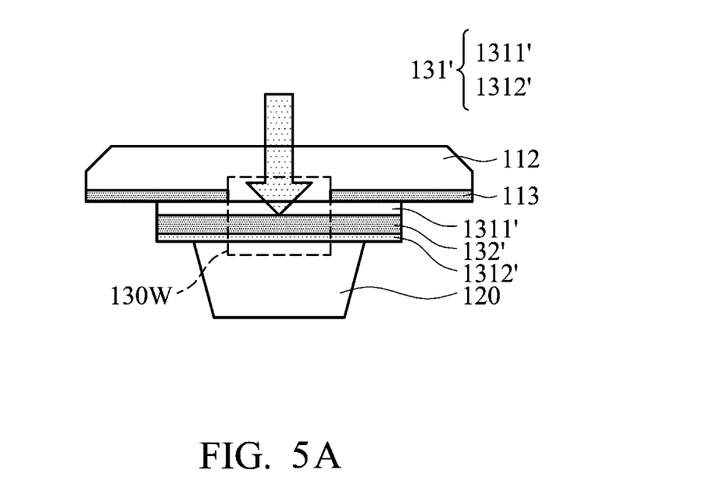
FIG. 5A shows another embodiment of the switchable layer of the embodiments of the invention, wherein the switchable layer is in the substantially opaque state.
Figure 5B:
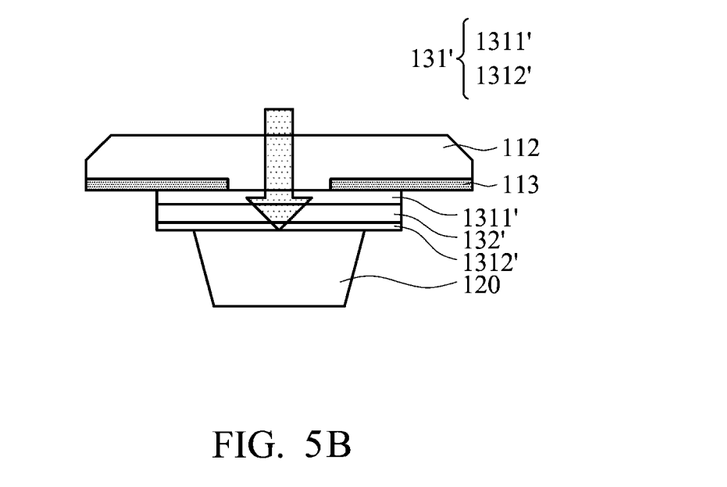
FIG. 5B shows the switchable layer of the embodiment of FIG. 5A, wherein the switchable layer is in the substantially transparent state.

Refer to FIGS. 5A and 5B. In another embodiment, the switchable layer 130' comprises an electrode assembly 131' and an electro-discoloring layer 132'. The electro-discoloring layer 132' is electrically connected to the electrode assembly 131', wherein the window 130W is located in the electro-discoloring layer 132'. The electrode assembly 131' can comprise a first electrode 1311' and a second electrode 1312'. When the switchable layer 130' is switched from the substantially opaque state (FIG. 5A) to the substantially transparent state (FIG. 5B), a voltage is applied to the electrode assembly 131' to discolor the electro-discoloring layer 132' and to increase light transmittance of the electro-discoloring layer 132'. When the switchable layer 130' is in the substantially opaque state (FIG. 5A), the light transmittance of the electro-discoloring layer 132' is lower than 10%.

Figure 6:
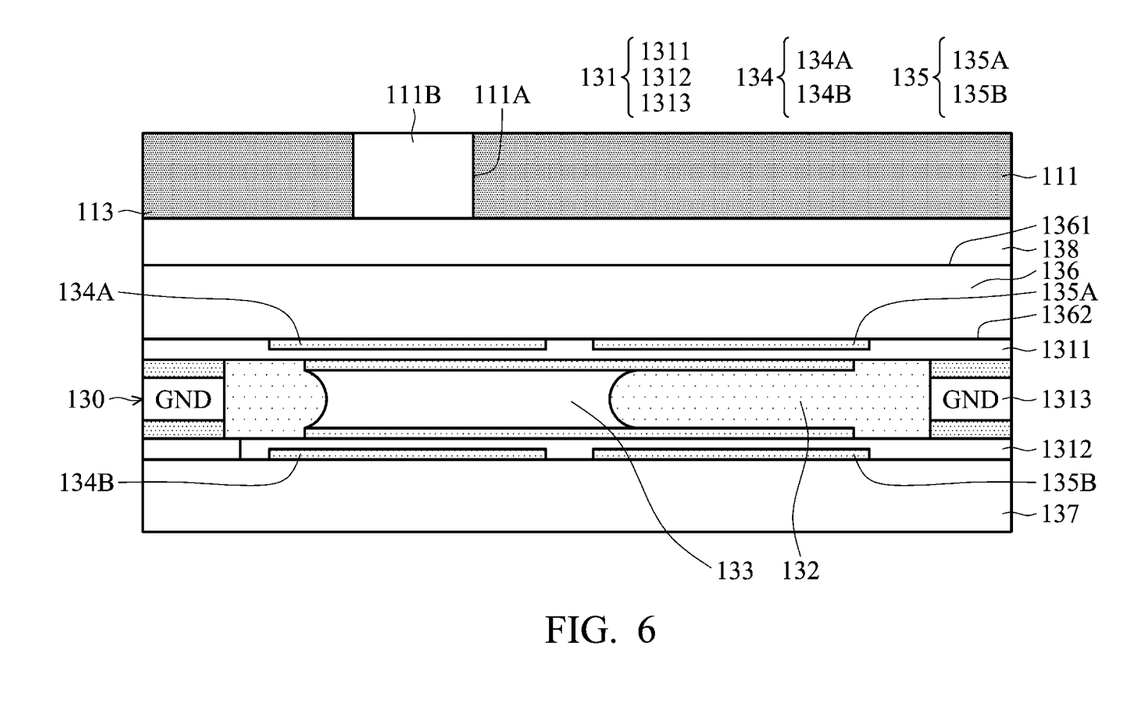
FIG. 6 shows a portable electronic device of the second embodiment of the invention.

In the first embodiment, the optical element and the sheltering element correspond to the front panel of the housing. However, the invention is not limited thereby. The optical element and the sheltering element can also correspond to, for example, the body of the housing. FIG. 6 shows a second embodiment of the invention, wherein the body 111 is formed with opaque material, and an aperture 111A is formed on the body, and a transparent material 111B is filled in the aperture 111A to be the transparent portion.

Figure 7:
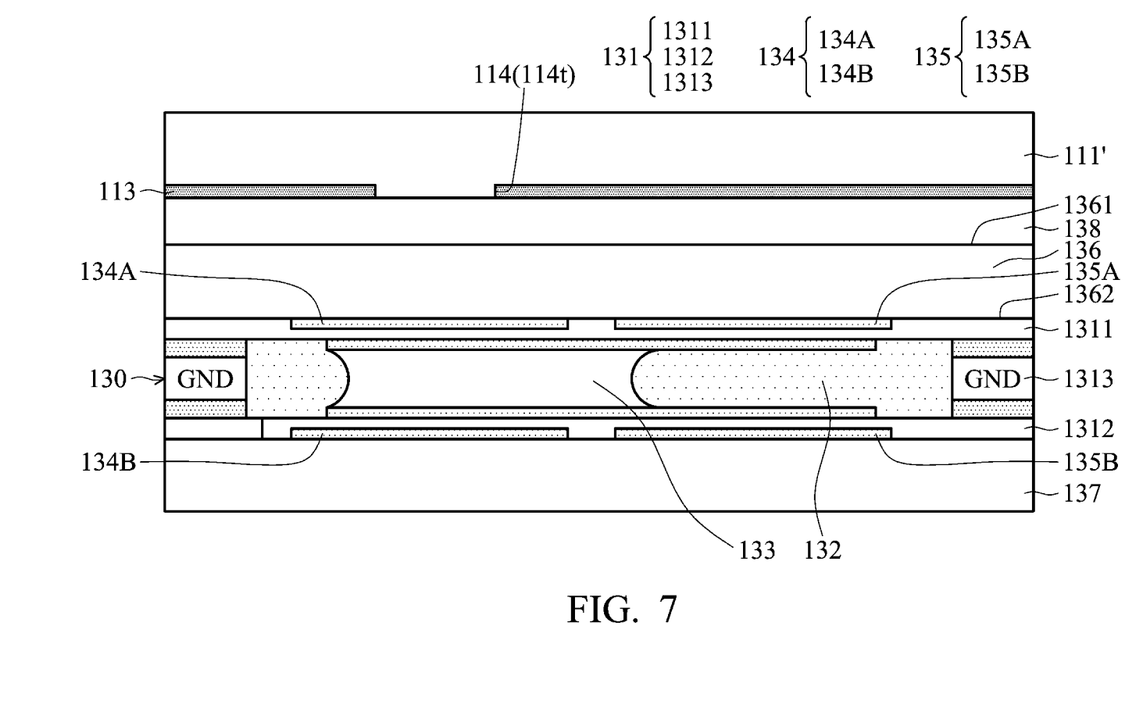
FIG. 7 shows a portable electronic device of the third embodiment of the invention.

FIG. 7 shows a third embodiment of the invention, wherein the body 111' is formed with transparent material, and the opaque layer 113 is printed on an inner surface of the body 111', and an second aperture 114 is formed on the opaque layer 113 to be the transparent portion 114t.

Figure 8:
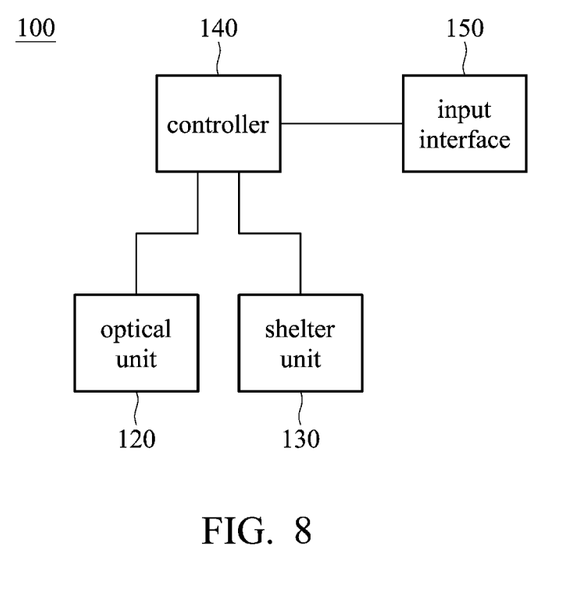
FIG. 8 is a block diagram of the portable electronic device of the embodiments of the invention.

Refer to FIG. 8. The portable electronic device 100 of the embodiment of the invention further comprises a controller 140 and an input interface 150, wherein the input interface 150 is coupled to the controller 140, and the controller 140 is coupled to the optical unit 120 and the switchable layer 130, and the controller 140 controls the switchable layer 130 and the optical unit 120 according an image capturing order from the input interface 150. The portable electronic device 100 switches the switchable layer 130 from the substantially opaque state to the substantially transparent state when the controller 140 receives the image capturing order, and the optical unit 120 is activated.

Figure 9:
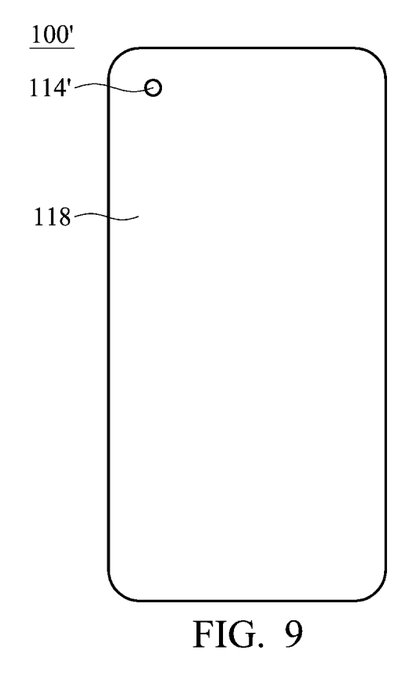
FIG. 9 shows a modified example of the embodiment of the invention.

FIG. 9 shows a portable electronic device 100' of a modified example of the embodiment of the invention, wherein the housing has the first surface (front surface) and a second surface (back surface) 118 disposed opposite to the first surface, wherein the second surface 118 is opaque and has a aperture 114'. In this embodiment, the optical element is disposed under the second surface 118, and the switchable layer is disposed between the optical element and the aperture and overlapping the aperture.

The portable electronic device of the embodiment of the invention can be a mobile phone, tablet computer, notebook or other portable electronic devices. The input interface can be a touch module, keyboard or other input interfaces.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
a housing, having a first surface and an opaque layer disposed under the first surface, the opaque layer having a first aperture and a second aperture;
a display module, disposed under the first surface and overlapped with the first aperture;
an optical element, disposed under the opaque layer; and
a switchable layer, disposed between the optical element and the second aperture and overlapping the second aperture, wherein the switchable layer is capable of being switched between a substantially opaque state and a substantially transparent state;
wherein the substantially opaque state prevents viewing of the optical element through the switchable layer and the substantially transparent state allows viewing of the optical element through the switchable layer.

2. The portable electronic device as claimed in claim 1, wherein the optical element comprises a transflective sheet.

3. The portable electronic device as claimed in claim 1, wherein the optical element comprises a printed logo, emblem, mark, or alphanumeric characters.

4. The portable electronic device as claimed in claim 1, wherein the switchable layer further comprises:
a first substrate;
a second substrate disposed under to the first substrate;
an opaque liquid disposed between the first substrate and the second substrate;
a first electrode disposed on the second substrate and overlapped with the second aperture; and
a second electrode disposed on the second substrate and under the opaque layer;
wherein the switchable layer is switched to the substantially transparent state by applying electrical potential on the first electrode so that the opaque liquid moves to the second electrode, and the switchable layer is switched to the substantially opaque state by applying electrical potential on the second electrode so that the opaque liquid moves to the first electrode.

5. The portable electronic device as claimed in claim 4, wherein the switchable layer further comprises a third electrode disposed on the first substrate and overlapped with the second aperture and a forth electrode disposed on the first substrate and under the opaque layer.

6. The portable electronic device as claimed in claim 1, wherein when the optical element generates light, the switchable layer is switched to the substantially transparent state so that the light is transmitted through the switchable layer and the second aperture, and when the optical element does not generate light, the switchable layer is switched to the substantially opaque state.

7. The portable electronic device as claimed in claim 1, wherein when optical element receives light via the second aperture, the switchable layer is switched to the substantially transparent state so that the light is transmitted through the switchable layer, and when the optical element does not receive the light, the switchable layer is switched to the substantially opaque state.

8. The portable electronic device as claimed in claim 4, wherein the switchable layer further comprises a first hydrophobic layer disposed on the first substrate, a second hydrophobic layer disposed on the second substrate and a side wall, disposed on the first substrate and extending toward the second substrate, and the opaque liquid is disposed between the side wall, the first substrate and the second substrate.

9. The portable electronic device as claimed in claim 8, wherein the side wall is grounded.

10. The portable electronic device as claimed in claim 4, wherein the first electrode is transparent.

11. The portable electronic device as claimed in claim 1, further comprises an anti-reflection layer disposed between the transparent layer and the switchable layer.

12. The portable electronic device as claimed in claim 1, wherein the switchable layer further comprises a second liquid disposed between the first substrate and the second substrate and the second liquid and the opaque liquid is not mixing.

13. The portable electronic device as claimed in claim 1, wherein the optical element is an image sensor or a light emitter.

14. The portable electronic device as claimed in claim 1, wherein switchable layer comprise a first substrate, a second substrate and electrochromic material disposed between the first substrate and the second substrate.

15. The portable electronic device as claimed in claim 14, wherein the switchable layer is switched to the substantially transparent state by applying electrical potential on the electrochromic material so the electrochromic material is changed to be substantially transparent and the switchable layer is switched to the substantially opaque state by not applying electrical potential on the electrochromic material so the electrochromic material is changed to be substantially opaque.

16. A portable electronic device, comprising:
- a housing, having a first surface and a second surface disposed opposite to the first surface, wherein the second surface is opaque and has a aperture;
- a display module, disposed under the first surface;
- an optical element, disposed under the second surface; and
- a switchable layer, disposed between the optical element and the aperture and overlapping the aperture, wherein the switchable layer is capable of being switched between a substantially opaque state and a substantially transparent state;
- wherein the substantially opaque state prevents viewing of the optical element through the switchable layer and the substantially transparent state allows viewing of the optical element through the switchable layer.

17. The portable electronic device as claimed in claim 16, wherein the switchable layer further comprises:
- a first substrate;
- a second substrate disposed under to the first substrate;
- an opaque liquid disposed between the first substrate and the second substrate;
- a first electrode disposed on the second substrate and overlapped with the aperture; and
- a second electrode disposed on the second substrate and under the second surface;
- wherein the switchable layer is switched to the substantially transparent state by applying electrical potential on the first electrode so that the opaque liquid moves to the second electrode, and the switchable layer is switched to the substantially opaque state by applying electrical potential on the second electrode so that the opaque liquid moves to the first electrode.

18. The portable electronic device as claimed in claim 16, wherein when the optical element generates light, the switchable layer is switched to the substantially transparent state so that the light is transmitted through the switchable layer and the second aperture, and when the optical element does not generate light, the switchable layer is switched to the substantially opaque state.

19. The portable electronic device as claimed in claim 16, wherein when optical element receives light via the second aperture, the switchable layer is switched to the substantially transparent state so that the light is transmitted through the switchable layer, and when the optical element does not receive the light, the switchable layer is switched to the substantially opaque state.

20. The portable electronic device as claimed in claim 16, wherein switchable layer comprise a first substrate, a second substrate and electrochromic material disposed between the first substrate and the second substrate, wherein the switchable layer is switched to the substantially transparent state by applying electrical potential on the electrochromic material so the electrochromic material is changed to be substantially transparent and the switchable layer is switched to the substantially opaque state by not applying electrical potential on the electrochromic material so the electrochromic material is changed to be substantially opaque.

* * * * *